(12) United States Patent
Mody et al.

(10) Patent No.: US 12,177,235 B2
(45) Date of Patent: Dec. 24, 2024

(54) PROCESS FOR IDENTIFYING A COMPROMISED DEVICE

(71) Applicant: Comcast Cable Communications, LLC, Philadelphia, PA (US)

(72) Inventors: Nirmal Mody, Lansdale, PA (US); Ryan Van Antwerp, Wilmington, DE (US)

(73) Assignee: Comcast Cable Communications, LLC, Philadelphia, PA (US)

(*) Notice: Subject to any disclaimer, the term of this patent is extended or adjusted under 35 U.S.C. 154(b) by 3 days.

(21) Appl. No.: 14/610,534

(22) Filed: Jan. 30, 2015

(65) Prior Publication Data

US 2016/0226898 A1   Aug. 4, 2016

(51) Int. Cl.
*H04L 9/40*         (2022.01)
*H04L 51/04*        (2022.01)
*H04L 51/214*       (2022.01)

(52) U.S. Cl.
CPC .......... *H04L 63/1425* (2013.01); *H04L 51/04* (2013.01); *H04L 51/214* (2022.05)

(58) Field of Classification Search
CPC ..... H04L 63/1425; H04L 51/14; H04L 51/04; H04L 63/1416; G06F 21/577
See application file for complete search history.

(56) References Cited

U.S. PATENT DOCUMENTS

| | | | |
|---|---|---|---|
| 7,707,641 B2 | 4/2010 | Schmeidler et al. |
| 7,836,506 B2 | 11/2010 | Liu |
| 7,844,700 B2 | 11/2010 | Marinescu et al. |
| 7,899,870 B2 | 3/2011 | Pearson et al. |
| 7,941,853 B2 | 5/2011 | Rozenberg et al. |
| 8,112,804 B2 | 2/2012 | Kwon et al. |
| 8,176,173 B2 | 5/2012 | Wang et al. |
| 8,321,941 B2 | 11/2012 | Tuvell et al. |

(Continued)

FOREIGN PATENT DOCUMENTS

| | | |
|---|---|---|
| CN | 101848197 A | 9/2010 |
| CN | 101986642 B | 3/2011 |

(Continued)

OTHER PUBLICATIONS

Antonakakis, et al., Detecting Malware Domains at the Upper DNS Hierarchy (2011) (16 pages).

(Continued)

*Primary Examiner* — Beemnet W Dada
(74) *Attorney, Agent, or Firm* — Ballard Spahr LLP

(57) ABSTRACT

Methods and systems are described whereby a server can forward a request from a device behind a NAT router to a system to determine if the request is suspicious. A server can receive a message via a network device, such as a NAT router, disposed at a location. The message can originate from one of a plurality of computing devices located downstream of the network device. The server can determine that the message originated from a compromised device and transmit a signal to facilitate execution of a first process on the computing devices located downstream from the compromised device, wherein, upon execution, the first process is configured to compare information located in a local storage of the computing device with a predetermined list of domains.

21 Claims, 6 Drawing Sheets

(56) References Cited

U.S. PATENT DOCUMENTS

| | | |
|---|---|---|
| 8,406,242 B2 | 3/2013 | Matsushita et al. |
| 8,468,602 B2 | 6/2013 | McDougal et al. |
| 8,479,296 B2 | 7/2013 | Mashevsky et al. |
| 2006/0075083 A1 | 4/2006 | Liu |
| 2006/0095970 A1 | 5/2006 | Rajagopal et al. |
| 2008/0028463 A1 | 1/2008 | Dagon et al. |
| 2008/0256619 A1 | 10/2008 | Neystadt et al. |
| 2008/0270612 A1 | 10/2008 | Malakapalli et al. |
| 2010/0162399 A1 | 6/2010 | Sheleheda et al. |
| 2010/0293273 A1 | 11/2010 | Basarrate et al. |
| 2010/0332593 A1 | 12/2010 | Barash et al. |
| 2011/0093953 A1 | 4/2011 | Kishore et al. |
| 2011/0247075 A1* | 10/2011 | Mykland .................. G06F 21/10 726/26 |
| 2011/0282997 A1 | 11/2011 | Prince et al. |
| 2011/0314145 A1 | 12/2011 | Raleigh et al. |
| 2012/0054869 A1 | 3/2012 | Yen et al. |
| 2012/0079596 A1 | 3/2012 | Thomas et al. |
| 2012/0084860 A1 | 4/2012 | Cao et al. |
| 2012/0106399 A1 | 5/2012 | Abendroth et al. |
| 2012/0136976 A1 | 5/2012 | Krishnan et al. |
| 2012/0233656 A1 | 9/2012 | Rieschick et al. |
| 2012/0233697 A1 | 9/2012 | Katardjiev et al. |
| 2013/0097329 A1 | 4/2013 | Alex et al. |
| 2013/0232574 A1* | 9/2013 | Carothers ................ G06F 21/56 726/22 |
| 2013/0246605 A1 | 9/2013 | Mahadik et al. |
| 2013/0247184 A1 | 9/2013 | Mahadik et al. |
| 2013/0263257 A1* | 10/2013 | O'Reirdan ............ G06F 21/552 726/22 |
| 2013/0269043 A1* | 10/2013 | Limaye .................. G06F 21/10 726/34 |
| 2013/0333038 A1* | 12/2013 | Chien ................. H04L 63/1408 726/23 |
| 2014/0310811 A1* | 10/2014 | Hentunen ........... H04L 63/1441 726/23 |
| 2015/0058469 A1* | 2/2015 | Li .......................... H04L 43/08 709/224 |
| 2016/0026796 A1* | 1/2016 | Monrose ............... G06F 21/562 726/24 |

FOREIGN PATENT DOCUMENTS

| | | |
|---|---|---|
| CN | 103038652 A | 4/2013 |
| EP | 1887754 B1 | 2/2008 |
| EP | 2230621 A2 | 10/2010 |
| EP | 2247064 A2 | 11/2010 |
| EP | 2326057 A1 | 5/2011 |
| WO | WO-2012164336 A1 | 12/2012 |
| WO | WO-2013113532 A1 | 8/2013 |

OTHER PUBLICATIONS

Kaspersky Anti-Spam Software Development Kit 3.0 (computer software) (2011) (1 page leaflet).

Kridel, Tim, Next-Generation Network Security: McAfee and Intel Help Thwart Sophisticated Attacks, Intel Software Adrenaline (2010) (5 pages).

Malicious Software Alert, Shaw, (accessed on Oct. 11, 2013) (available at www.shaw.ca/virusprotection/) (3 pages).

Masiello, Sam, Can we ever solve the spam problem?, McAfee Security Journal, Issue 6, 2010, 25-26.

Ramachandran, et al., Revealing Botnet Membership Using DNSBL Counter-Intelligence (2006) (6 pages).

Yan, et al., RatBot: Anti-Enumeration Peer-to-Peer Botnets, 2010 Annual Computer Security Applications Conference, Los Alamos National Laboratory (2010) (16 pages).

Yoshinobu, Matsuzaki, DNS amplification attacks, Internet Initiative Japan, Inc. (2006) (22 pages).

\* cited by examiner

PROCESS FOR IDENTIFYING A COMPROMISED DEVICE

BACKGROUND

During network communications, a server may on occasion receive a suspicious request from a remote client. In some instances, a user of the remote client be unaware of the suspicious request. The server is unable to inform the user of the issue because the identity of the remote client is hidden (for example, by a Network Address Translation (NAT) router). These and other shortcomings of the prior art are addressed by the present disclosure.

SUMMARY

It is to be understood that both the following general description and the following detailed description are exemplary and explanatory only and are not restrictive, as claimed. In an aspect, methods and systems are described whereby a server can determine whether a request from a device that is behind a NAT router (or similar device) is suspicious. In response to determining that the request is suspicious, one or more devices located behind the NAT router can be instructed to perform various operations to determine whether (and which) one of the devices is compromised (e.g., download software to compare a local DNS cache with a list of domains that are known sources of malware, spyware, viruses, Trojans, and the like).

In an aspect, methods and systems are described whereby a first computing device (e.g., a server) can receive a message via a network device. The message can originate from a second computing device (e.g., client device) located downstream of the network device. The first computing device can determine that the message originated from a device that has been compromised (e.g., the second computing device). The first computing device can transmit a signal to facilitate execution of a first process on the second computing device, wherein upon execution, the first process can be configured to compare information located in a local storage of the second computing device with a predetermined list of domains.

In another aspect, methods and systems are described whereby an intermediate network device can receive a message indicating that one or more of a plurality of devices is compromised. The intermediate network device can transmit a signal to facilitate execution of a first process on the one or more of the plurality of devices. Upon execution on the one or more of the plurality of devices, the first process can be configured to compare information located in a local storage of the one or more of the plurality of devices with a predetermined list of domains.

In a further aspect, methods and systems are described whereby a first computing device on a shared network can receive a notification that at least one of a plurality of computing devices on the shared network has been compromised. The first computing device can request and/or receive computer-executable code for performing a first process. Upon execution, the first process can be configured to compare information located in a local storage with a predetermined list of domains.

Additional advantages will be set forth in part in the description, which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
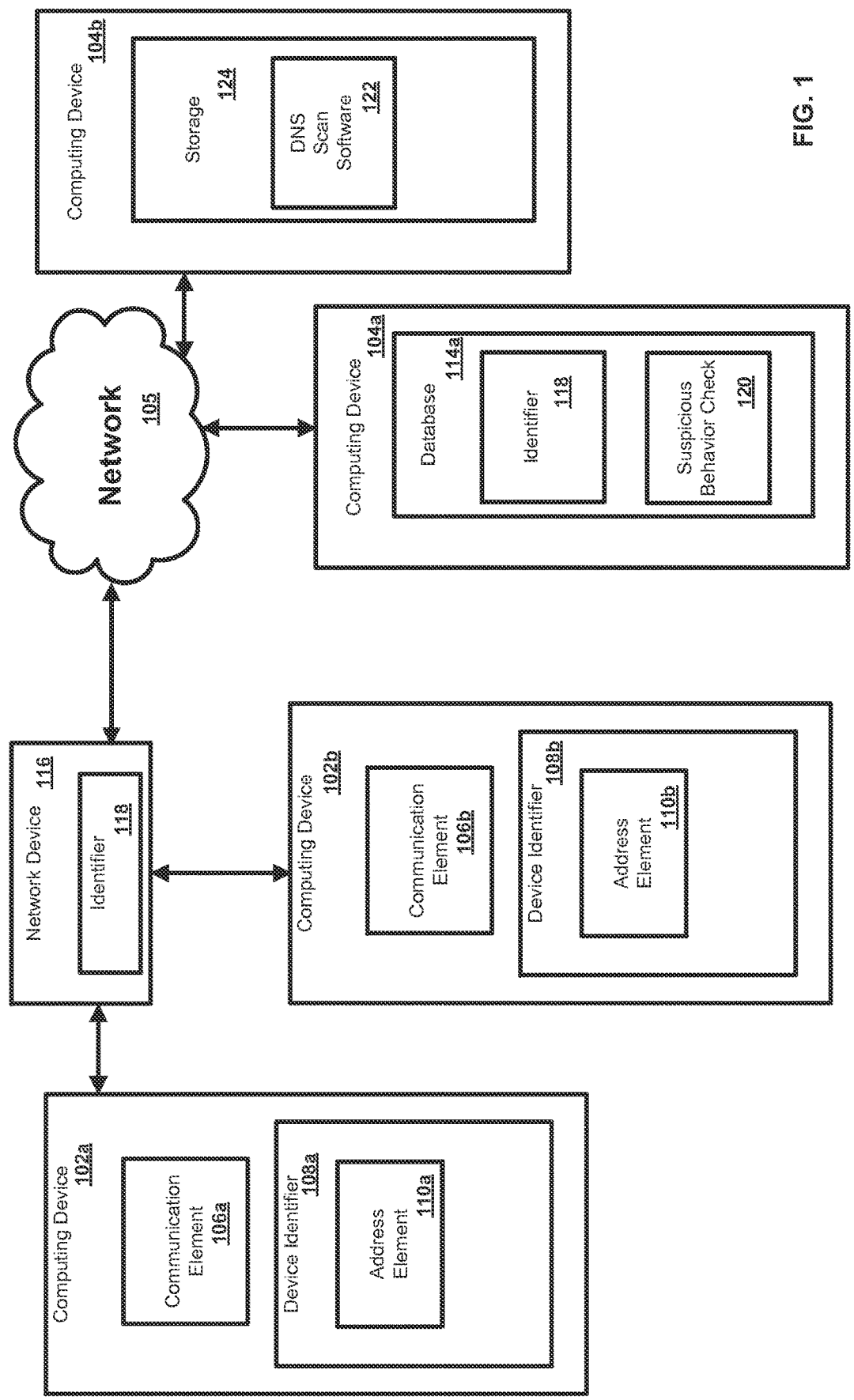
FIG. 1 illustrates an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, hut not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions, which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The systems and methods of this disclosure can detect malicious software running on a computing device. By way of example, malicious software can cause the computing device to attempt to access a particular host. The attempt to access the particular host can begin with the computing device transmitting a first request to a network address translation (NAT) router. The NAT router will hide the identity (IP address) of the computing device and transmit the first request to a DNS server. The first request will appear to the DNS server as if it originated from the NAT router. In an aspect, the DNS server can determine that the request originated from a computing device compromised by malicious software. For example, a device can be compromised if the device is affected by malicious software or the device that is otherwise vulnerable (e.g., unpatched software). For example, a computing device that sends several requests for a resource, such as a URL, in a short span of time, can be indicative of a device that is affected by malicious software.

If the DNS server determines that the first request originated from a compromised device, the DNS server can transmit an alert signal to the NAT router. The NAT router can then transmit the alert signal to each of the computing devices attached to the NAT router. The alert signal can indicate that at least one of the computing devices attached to the NAT router is compromised. The alert signal can cause each of the computing devices to transmit a second request for an additional file to a file server. The file server can transmit a file in response to receiving the second request. The file can comprise executable files, data files, combinations thereof, and the like. Each of the plurality of computing devices can execute the file, which can compare entries in a local DNS cache of each computing device to a list of known malicious domains. If the comparison indicates that an entry in the local DNS cache of a particular computing device is also on the list of known malicious domains, that particular computing device can receive one or more instructions. In an aspect, the one or more instructions can comprise instructions to download software to remove malicious software, to discontinue further communications, to shut down, to alert one or more users, to patch existing software, combinations thereof, and the like.

In one aspect of the disclosure, a system can be configured to provide malware detection for devices connected to a network device. FIG. 1 illustrates various aspects of an exemplary environment in which the present methods and systems can operate. The present disclosure is relevant to systems and methods for providing services to a device, for example, a computing device such as a computer, tablet, mobile device, communications terminal, or the like. In an aspect, one or more network devices can be configured to provide various services to one or more devices, such as devices located at or near a premises. In another aspect, the network devices can be configured to recognize an authoritative device (e.g., a network device 116) for the premises and/or a particular service or services available at the premises. As an example, an authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a plurality of computing devices 102a, 102b in communication with one or more computing devices 104a, 104b such as a server, for example. The computing devices 104a, 104b can be disposed remotely relative to the plurality of computing devices 102a, 102b. As an example, the plurality of computing devices 102a, 102b and the computing devices 104a, 104b can be in communication via a private and/or public network 105 such as the Internet or a local area network. Other forms of communications can be used such as wired and wireless telecommunication channels, for example.

In an aspect, the computing devices 102*a*, 102*b* can be an electronic device such as a computer, a smart phone, a laptop, a tablet, a set top box, a display device, or other device capable of communicating with the computing devices 104*a*, 104*b*, As an example, the computing devices 102*a*, 102*b* can comprise a communication element 106*a*, 106*b* for providing an interface to a user to interact with the computing devices 102*a*, 102*b* and/or the computing devices 104*a*, 104*b*. The communication elements 106*a*, 106*b* can be any interface for presenting and/or receiving information to/from the user, such as user feedback. An example interface may be a communication interface such as a web browser (e.g., Internet Explorer, Mozilla Firefox, Google Chrome, Safari, or the like). Another example interface may be a communication interface such as a network-enabled application, such as an Internet enabled application. Other software, hardware, and/or interfaces can be used to provide communication between the user and one or more of the computing devices 102*a*, 102*b* and the computing devices 104*a*, 104*b*. As an example, the communication element 106*a*, 106*b* can request or query various files from a local source and/or a remote source. As a further example, the communication element 106*a*, 106*b* can transmit data to a local or remote device such as the computing device 104*a*, 104*b*.

The computing devices 102*a*, 102*b* can have a local domain name system (DNS) cache for mapping Internet domain names to internet protocol (IP) addresses. In an aspect, the computing devices 102*a*, 102*b* can be associated with a user identifier or device identifiers 108*a*, 108*b*. As an example, the device identifiers 108*a*, 108*b* can be any identifier, token, character, string, or the like, for differentiating one user or computing device (e.g., computing device 102*a*) from another user or computing device (e.g., computing device 102*b*). In a further aspect, the device identifiers 108*a*, 108*b* can identify a user or computing device 102*a*, 102*b* as belonging to a particular class of users or computing devices. As a further example, the device identifiers 108*a*, 108*b* can comprise information relating to the computing devices 102*a*, 102*b* such as a manufacturer, a model or type of device, a service provider associated with the computing devices 102*a*, 102*b*, a state of the computing devices 102*a*, 102*b*, a locator, and/or a label or classifier. Other information can be represented by the device identifiers 108*a*, 108*b*.

In an aspect, the device identifiers 108*a*, 108*b* can comprise an address element 110*a*, 110*b*. In an aspect, the address elements 110*a*, 110*b* can comprise or provide an internet protocol address, a network address, a media access control (MAC) address, an Internet address, or the like. As an example, the address elements 110*a*, 110*b* can be relied upon to establish a communication session between the computing devices 102*a*, 102*b* and the computing devices 104*a*, 104*b* or other devices and/or networks, including the network device 116. As a further example, the address elements 110*a*, 110*b* can be used as an identifier or locator of the computing devices 102*a*, 102*b*. In an aspect, the address elements 110*a*, 110*b* can be persistent for a particular network.

In an aspect, the computing devices 104*a*, 104*b* can be a server for communicating with the computing devices 102*a*, 102*b*. As an example, the computing devices 104*a*, 104*b* can communicate with the computing devices 102*a*, 102*b* for providing data and/or services. As an example, the computing devices 104*a*, 104*b* can provide services such as Domain Name Server (DNS) mapping, reverse DNS mapping, DNS malware detection, or the like. In an aspect, the computing devices 104*a*, 104*b* can translate an object entered into a communication element 106*a*, 106*b* of computing devices 102*a*, 102*b*, such as, for example, translating a web site entered into a web browser into an IP address.

In an aspect, one or more network devices 116 can be in communication with a network such as network 105. As an example, one or more of the network devices 116 can facilitate the connection of a device, such as computing device 102, to the network 105. As a further example, one or more of the network devices 116 can be configured as a wireless access point (WAP). In an aspect, one or more of the network devices 116 can be configured to allow one or more wireless devices to connect to a wired and/or wireless network using Bluetooth or any desired method or standard.

In an aspect, the one or more network devices 116 can be configured as a local area network (LAN). As an example, the one or more network devices 116 can comprise a dual band wireless access point. As an example, the one or more network devices 116 can be configured with a first service set identifier (SSID) associated with a user network or private network) to function as a local network for a particular user or users. As a further example, the one or more network devices 116 can be configured with a second service set identifier (SSID) (e.g., associated with a public/community network or a hidden network) to function as a secondary network or redundant network for connected communication devices.

In an aspect, the one or more network devices 116 can comprise an identifier 118.

As an example, one or more identifiers can be or relate to an Internet Protocol (IP) Address (e.g., IPv4/IPv6) or a media access control address (MAC address) or the like. As a further example, one or more identifiers 118 can be a unique identifier for facilitating communications on the physical network segment. In an aspect, each of the one or more network devices 116 can comprise a distinct identifier 118. As an example, the identifiers 118 can be associated with a physical location of the network devices 116.

In an aspect, the computing device 104*a* can determine if a request entered into a communication element 106*a*, 106*b* of a computing device 102*a*, 102*b* is a valid request. A request that is not suspicious can be considered valid; a suspicious request can be considered invalid. In another aspect, the computing device 104*a* can receive a determination of the validity of a request entered into a communication element 106*a*, 106*b* of a computing device 102*a*, 102*b*. For example, a DNS server can determine the validity of a request and forward the determination to the computing device 104*a*. For example, a request can be one of several requests for a particular website sent from the same computing device in a short period of time. In another example, a request can be for a website or application that is known to be malicious. In an aspect, an e-mail system can detect a suspicious e-mail message, including, but not limited to, detecting a suspicious "to" address, "from" address, subject, attachment, message, and/or link within a message. For example, the request can be to send an e-mail message where the "from" line does not match the origin of the message. In another example, an e-mail message can comprise a hyperlink that is known to be malicious. In yet another example, an e-mail message can comprise several instances of one or more keywords known to be prevalent in unsolicited e-mail offers. Determining validity of a request will be described in more detail below with respect to the descriptions of FIGS. 3-5.

In an aspect, the computing device 104*a* can comprise a database 114. Any information can be stored in and retrieved from the database 114. The database 114 can be disposed remotely from the computing device 104*a* and accessed via direct or indirect connection. The database 114 can be integrated with the computing system 104*a* or some other device or system. The database 114 can comprise one or more identifiers 118, wherein each of the identifiers 118 can be used to identify a unique network device 116. In an aspect, the computing device 104*a* can track the results of the determination of the validity of a request in a suspicious behavior check field 120. In an aspect, the computing device 104*a* can, in the database 114, map the results of a suspicious behavior check 120 with the identifier 118 associated with the network device 116 that transmitted the request. In an aspect, when the computing device 104*a* has an entry in database 114 that has been flagged for suspicious behavior by suspicious behavior check 120, the computing device 104*a* can take the identifier 118 mapped to the flagged behavior and transmit a signal to the network device 116 associated with the identifier 118. In a further aspect, the signal transmitted to the network device 116 with the associated identifier 118 can cause each computing device 102*a*, 102*b* attached to the network device 116 to receive a message. In an aspect, the message can suggest that a user download malware removal software. In an aspect, the message can automatically cause the computing device to download and/or run malware removal software.

In an aspect, upon determining that a request is invalid, the computing device 104*a*, 104*b* can transmit a signal to the network device 116 associated with the identifier 118, wherein the identifier 118 is associated with the invalid request. In another aspect, upon receiving a determination that a request is invalid, the computing device 104*a*, 104*b* can transmit a signal to the network device 116 associated with the identifier 118, wherein the identifier 118 is associated with the invalid request.

In an aspect, upon receiving a signal indicating that there was an invalid request, the network device 116 can transmit the signal (or generate and transmit a different signal) to one or more of the computing devices 102*a*, 102*b* in communication with the network device 116. In an aspect, upon receiving a signal indicating that there was an invalid request, the network device 116 can transmit the signal to all of the computing devices 102*a*, 102*b* in communication with the network device 116. In another aspect, upon receiving a signal indicating that there was an invalid request, the network device 116 can transmit the signal to one or more of the computing devices 102*a*, 102*b* in direct communication with the network device 116.

In an aspect, a computing device 104*b* can comprise a storage 124. The storage 124 can be any type of memory. In an aspect, the storage 124 can comprise a DNS scan software 122. In an aspect, the DNS scan software 122 can be downloaded by the one or more computing devices 102*a*, 102*b* in response to receiving a message originating from computing device 104*a* that one or more computing devices 102*a*, 102*b* in communication with the network device 116 is infected with malware. In an aspect, the DNS scan software 122 can be a plurality of programs from which an appropriate program can be chosen based on one or more factors, such as type of suspicious activity detected, computing device used, operating system running on the computing device, subscription associated with the computing device, and the like. In an aspect, the one or more computing devices 102*a*, 102*b* can run the downloaded DNS scan software 122. In an aspect, the DNS scan software 122, when run, can scan the local DNS cache of the one or more computing devices 102*a*, 102*b* to determine if the one or more computing devices 102*a*, 102*b* have been exposed to a potential source of malware (e.g., determine if the computing device is infected). In an aspect, if one of the one or more computing devices 102*a*, 102*b* is determined to be infected with malware, then further corrective action can be taken.

Figure 2:
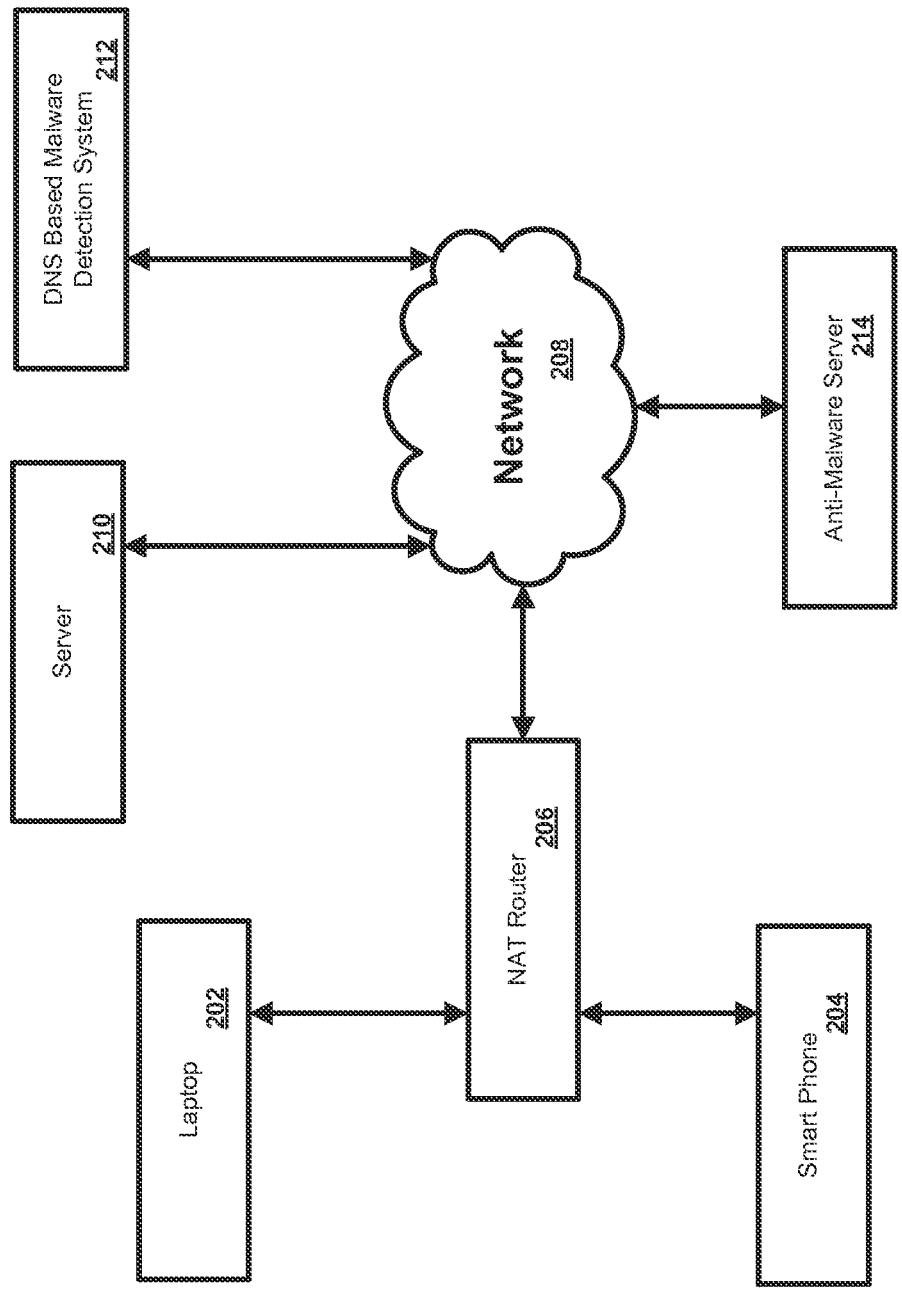
FIG. 2 illustrates an exemplary system.

FIG. 2 illustrates various aspects of an exemplary environment in which the present methods and systems can operate. In an aspect, a laptop 202 can serve as a computing device 102*a*, 102*b*. In an aspect, a smart phone 204 can serve as a computing device 102*a*, 102*b*. In a further aspect, a computing device can include any device capable of network communications. In an aspect, the computing device 102*a*, 102*b* can comprise a local domain name system (DNS) cache for mapping Internet domain names to internet protocol (IP) addresses. In an aspect, a network address translation (NAT) router 206 can serve as a network device 116. In an aspect, a network 208 can serve as a network 105. In an aspect, a server 210 can serve as a computing device 104*a*, 104*b*. The server 210 can be located remotely from laptop 202, smart phone 204, and a plurality of other computing devices. The server 210 can be any device that can receive a request and forward the request to a DNS based malware detection system 212 for processing. In an aspect, a request can be a request for a website, a request for an application, a request to send an e-mail, and the like. In an aspect, a DNS based malware detection system 212 can be incorporated into computing device 104*a*, 104*b* or can be a separate device. In an aspect, an anti-malware server 214 can be incorporated into computing device 104*a*, 104*b* or can be a separate device.

In an aspect, the DNS based malware detection system 212 can classify a request as suspicious. A request can be classified as suspicious if the request is part of a pattern of requests indicative of suspicious activity. For example, a request can be one of several requests for a particular website sent from the same computing device in a short period of time. In another example, a request can be for a website or application that is known to be malicious. In an aspect, the DNS based malware detection system 212 can detect a suspicious e-mail message, including, but not limited to, detecting a suspicious "to" address, "from" address, subject, attachment, message, and/or within a message. For example, the request can be to send an e-mail message where the "from" line does not match the origin of the message. In another example, an e-mail message can comprise a hyperlink that is known to be malicious. In yet another example, an e-mail message can comprise several instances of one or more keywords known to be prevalent in unsolicited e-mail offers. Determining the validity of a request will be described in more detail below with respect to the descriptions of FIGS. 3-5. In an aspect, a server 210 can comprise the DNS based malware detection system 212. In an aspect, the DNS based malware detection system 212 can comprise server 210.

In an aspect, an anti-malware server 214 can comprise storage, such as memory. The memory can be organized into a structure, such as a database. In an aspect, the database can comprise one or more sets of computer executable instructions (e.g., files, programs, software, etc.). In an aspect, the one or more sets of computer executable instructions stored in the database can, when executed on a computing device, such as laptop 202 and/or smart phone 204, perform a process. In an aspect, the process can compare a DNS cache on a computing device, such as laptop 202 and/or smart phone 204, with a list of suspicious domains. In a further aspect, the process can signal an alarm in the event that the comparison of the local DNS cache with the list of suspicious domains yields a match. In an aspect, the process can compare the DNS cache with a list of approved domains. In a further aspect, the process can signal an alarm in the event that there is an entry in the local DNS cache that is not contained in the list of approved domains. In an aspect, an alarm can indicate that the computing device executing the process is compromised by malware or other harmful software. In an aspect, in response to determining that an entry in the local DNS cache of a computing device, such as laptop 202 and/or smart phone 204, is suspicious, the process can cause the computing device to download corrective software. In an aspect, the corrective software can be downloaded from the anti-malware server 214. In an aspect, the corrective software can be downloaded from a server dedicated to providing corrective software. In an aspect, a particular program, a particular version of a program, and/or a particular update for a program can be downloaded based on the one or more entries in the local DNS cache, which indicated that corrective software should be downloaded. For example, if a particular malicious program is known to request a particular website, a malicious program remover is known to remove the particular malicious program, and the scan of the local DNS cache of the computing device reveals that the particular website has recently been requested, then the malicious program remover can be requested, installed, and/or executed on the computing device to remove the malicious program.

In an aspect, a request made by the computing device can be a request to access one or more files located at an address (e.g., a domain, website, etc. . . . ). In another aspect, the request can be a request to transmit an e-mail message to an e-mail address. A computing device, such as laptop 202, can transmit the request to NAT router 206. NAT router 206 can then transmit the request through the network 208. NAT router 206 will appear as the requester to subsequent devices in the network 208 (such as, a server 210, DNS based malware detection system 212, and anti-malware server 214), hiding the true requester (e.g., laptop 202). The request can be routed through the network 208 to a server 210. In an aspect, the server 210 can be a DNS server, in an aspect, the server 210 can translate the address transmitted from laptop 202 into an Internet Protocol (IP) address. In an aspect, the server 210 can be an electronic mail (e-mail) server. In an aspect, the server 210 can interpret e-mail addressing information, direct outgoing messages, and facilitate the reception of incoming messages.

In an aspect, a DNS based malware detection system 212 can determine if the request received by the server 210 is suspicious. In an aspect, the server 210 can process the request (such as a DNS server translating a request for a website or an e-mail server parsing out the "from address" of an e-mail message), prior to transmitting the processed request to the DNS based malware detection system 212. In an aspect, the server 210 can transmit the originally transmitted request to the DNS based malware detection system 212. In an aspect, the NAT router 206 can transmit the originally transmitted request to the DNS based malware detection system 212 via network 208. In alternative aspects, the server 210 may not need to transmit the request across the network 208 to DNS based malware detection system 212. For example, a single computing device can comprise both the server 210 and the DNS based malware detection system 212. In another example, the server 210 can be connected to the DNS based malware detection system 212, either directly, or through a network other than network 208.

In an aspect, a determination that a request is suspicious can indicate that the requesting device is compromised by malware.

In an aspect, the DNS based malware detection system 212 can transmit a signal in response to determining that the request is suspicious. In an aspect, the DNS based malware detection system 212 will not know the identity of the originator (e.g., laptop 202 and/or smart phone 204) of the request. For example, the NAT router 206 will hide the identity of the originator (for example, laptop 202). If the DNS based malware detection system 212 does not know the identity of the originator, then the DNS based malware detection system 212 cannot transmit the signal to the originator. Instead, the DNS based malware detection system 212 can transmit a signal to the NAT router 206, routed through network 208. In an aspect, the signal can indicate that some unknown device attached to the NAT router 206 is suspected of being compromised by malware or the like. In an aspect, the NAT router 206 can then transmit a signal to each attached computing device, for example laptop 202 and smart phone 204. In an aspect, the signal that the NAT router 206 transmits to each attached computing device, for example, laptop 202 and smart phone 204, can be the same signal transmitted to the NAT router 206 from the DNS based malware detection system 212. In an alternative aspect, the signal that the NAT router 206 transmits to each attached computing device, for example, laptop 202 and smart phone 204, can be generated in response to receiving a signal from the DNS based malware detection system 212. In a further aspect, the signal sent from the NAT router 206 to the attached computing devices can be generated by the NAT router 206 and formatted based on the type of attached computing device.

In an aspect, the computing devices attached to the NAT router 206, for example, laptop 202 and smart phone 204, can transmit a request for a set of computer executable instructions in response to receiving a signal indicating that one of the devices attached to the NAT router 206 is suspected of being compromised by malware. In an aspect, the laptop 202 can transmit the request to the NAT router 206. In an aspect, the NAT router 206 can transmit the request from the laptop 202 through the network 208 to the anti-malware server 214. In an aspect, the smart phone 204 can transmit the request to the NAT router 206. In an aspect, the NAT router 206 can transmit the request from the smart phone 204 through the network 208 to the anti-malware server 214.

In an aspect, the anti-malware server 214 can comprise a plurality of sets of computer executable instructions. In an aspect, the anti-malware server 214 can select an appropriate set of computer executable instructions of the plurality of sets of computer executable instructions based on one or more factors, such as type of suspicious activity detected, computing device used, operating system running on the computing device, subscription associated with the computing device, and the like, in response to receiving a request from the computing devices attached to the NAT router 206, for example laptop 202 and smart phone 204. In an aspect, the anti-malware server 214 can transmit the selected set (or sets) of computer executable instructions to the devices attached to the NAT router 206, for example laptop 202 and smart phone 204. In an aspect, in response to receiving a request from the laptop 202, the anti-malware server 214 can transmit a set of computer executable instructions through the network 208 to the NAT router 206; the NAT router 206 can then transmit the set of computer executable instructions to the laptop 202. In an aspect, when the laptop 202 executes the set of computer executable instructions, a process can be performed that compares a DNS cache of the laptop 202 to a list of suspicious domains. The list of suspicious domains can be provided to the laptop 202 or can be maintained and accessed at the anti-malware server 214. In an aspect, in response to receiving a request from the smart phone 204, the anti-malware server 214 can transmit a set of computer executable instructions through the network 208 to the NAT router 206; the NAT router 206 can transmit the set of computer executable instructions to the smart phone 204. In an aspect, when the smart phone 204 executes the set of computer executable instructions, a process can be performed that compares a DNS cache of the smart phone 204 to a list of suspicious domains. The list of suspicious domains can be provided to the laptop 202 or can be maintained at the anti-malware server 214. In an aspect, if one of the one or more computing devices 102a, 102b is determined to be infected with malware, then further corrective action can be taken.

Figure 3:
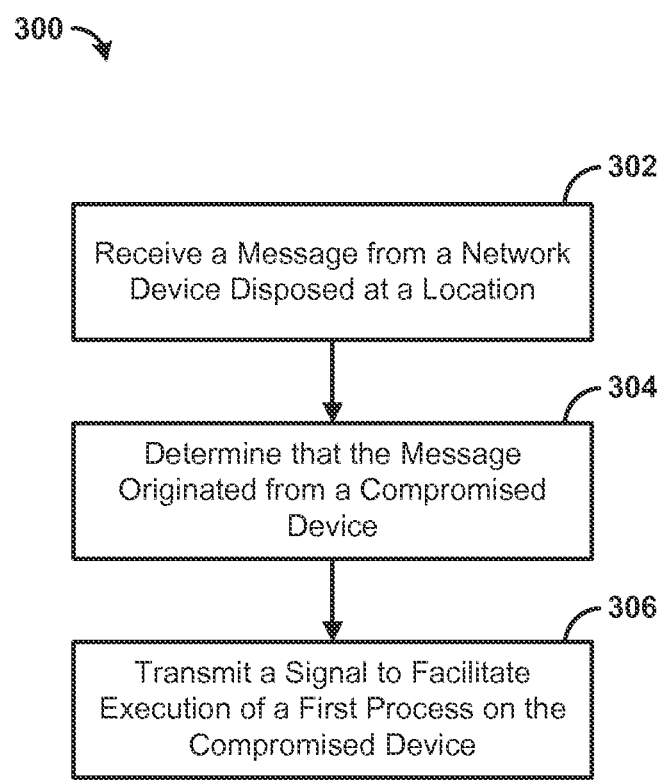
FIG. 3 illustrates a flow diagram of an exemplary process performed at a computing device.

Turning now to FIG. 3, a process 300 in accordance with the systems and methods disclosed herein is illustrated. In step 302, a computing device 104a, 104b can receive a message via a network device 116 disposed at a location. In an aspect, the message can originate from a first computing device located downstream of the network device 116, such as computing device 102a or computing device 102b. The message can comprise a request for a website, a request for an application, a request to send an e-mail, an e-mail message, and the like. In an aspect, the message can comprise a request to access a known malware server, one of several requests for a particular website sent from the same computing device in a short period of time, a request for a website or application that is known to be malicious, a suspicious e-mail message, or the like. In an aspect, a suspicious e-mail message can comprise a suspicious "to" address, "from" address, subject, attachment, body, and/or link within a body. For example, the message can be an e-mail message where the "from" address does not match the origin of the message. In another example, an e-mail message can comprise a hyperlink that is known to be malicious. In yet another example, an e-mail message can comprise several instances of one or more keywords known to be prevalent in unsolicited e-mail offers. In an aspect, the network device can comprise a network address translation (NAT) router.

In step 304, the computing device 104a, 104b can determine that the message originated from a compromised device. The determination that the message originated from a compromised device can comprise comparing the message with a predetermined list of domains. In an aspect, the predetermined list of domains can be a list of domains considered to be suspicious. In a further aspect, if the message comprises a request for a domain that is also on the list of domains considered to be suspicious, then the device from which the message originated can be considered compromised. For example, Table 1 represents an exemplary list of domains considered to be suspicious:

TABLE 1 www.clickbait.com
www.xxxspam.com
www.cheapquackRx.com
www.freeStuffForShopping.com In an aspect, a message can comprise a header. The following is an example of a header:

From: Joe Smith (click@clickbait.com)
Subject: Free Computer
Date: Jan. 1, 2015 3:30:58 PM PDT
To: user@example.com
Return-Path: <joe.smith@clickbait.com>
Envelope-To: user@example.com
Delivery-Date; Thur, 1 Jan. 2015 15:31:01-0700

In an aspect, the header can comprise a domain, e.g., "clickbait.com." In an aspect, the domain in the header of the message can be compared with the list of domains in Table 1. If the domain in the header of the message matches one of the list of domains in Table 1 (in the example, "clickbait.com"), then the device that originated the message can be considered compromised.

In an aspect, the predetermined list of domains can be a list of domains considered to be legitimate. If the message does not comprise a request for a domain that is also on the list of domains considered to be legitimate, then the device can be considered compromised. For example, Table 2 represents an exemplary list of domains considered to be legitimate:

TABLE 2 www.goodSite.com
www.saveSite.com
www.protectedSite.com
www.angelicSite.com

In an aspect, a message can comprise a header. The following is an example of a header:

From: John Doe (host@superspammer.com)
Subject: Free Smartphone
Date: Jan. 3, 2015 2:22:22, PM PDT
To: user@example.com
Return-Path: <john.doe@superspammer.com>
Envelope-To: user@example.com
Delivery-Date: Sat, 3 Jan. 2015 2:22:45-0900

In an aspect, the header can comprise a domain, e.g., "superspammer.com." In an aspect, the domain in the header of the message can be compared with the list of domains in Table 2. If the domain in the header of the message (in the example, "superspammer.com") does not match one of the list of domains in Table 2, then the device that originated the message can be considered compromised. In another further aspect, if e message does not comprise a request for a domain that is also on the list of domains considered to be legitimate, then the message can be flagged for further inspection.

In an aspect, further inspection can comprise extracting a domain requested from the message and monitoring for more messages from the same originator. In a further aspect, monitoring for more messages from the same originator can comprise flagging a message requesting the same domain in a threshold window of time as suspicious. In another aspect, the determination that the message originated from a compromised device can comprise determining that the message claims to be from one source, but is actually from a second source. For example, an e-mail message can purport to be from one e-mail address in the "from" address, but actually be from a second e-mail address.

In an aspect, the determination that the message originated from a compromised device can comprise recognizing the message as part of a suspicious pattern. A suspicious pattern can comprise accessing an electronic file a plurality of times or more during a threshold window of time. A suspicious pattern can comprise accessing a domain a threshold number of times or more during a threshold window of time. A suspicious pattern can comprise accessing an electronic file at the same time on two or more days. A suspicious pattern can comprise accessing a domain at the same time on two or more days.

The determination that the message originated from a compromised device can comprise comparing the sender of the message with a predetermined list of domains. The determination that the message originated from a compromised device can comprise comparing the claimed sender of the message with a predetermined list of domains. The determination that the message originated from a compromised device can comprise comparing one or more of the addressees of the message, including those addressees carbon copied (cc'd) and blind carbon copied (bcc'd), with a predetermined list of domains. The determination that the message originated from a compromised device can comprise comparing the subject of the message with a predetermined list of domains. The determination that the message originated from a compromised device can comprise comparing the body of the message, including one or more links or hyperlinks, with a predetermined list of domains.

In step 306, the computing device 104a, 104b can transmit a signal to facilitate execution of a first process on the first computing device located downstream from the network device 116, such as computing device 102a or computing device 102b. In an aspect, transmitting the signal to facilitate execution of the first process on the first computing device can comprise calling a user. In an aspect, transmitting the signal to facilitate execution of the first process on the first computing device can comprise causing a physical message to be sent to a user, for example, a letter or a facsimile. In an aspect, transmitting the signal to facilitate execution of the first process on the first computing device can comprise causing a second computing device to communicate with a third computing device automatically. In an aspect, transmitting the signal to facilitate execution of the first process on the first computing device can comprise causing a browser to be directed to an address comprising a message. In an aspect, transmitting the signal to facilitate execution of the first process on the first computing device can comprise causing a message to be displayed in a browser. In an aspect, transmitting the signal to facilitate execution of the first process on the first computing device can comprise using a network-enabled application. In an aspect, transmitting the signal to facilitate execution of the first process on the first computing device can comprise sending a user a Short Message Service (SMS) message. In an aspect, transmitting the signal to facilitate execution of the first process on the first computing device can comprise sending a user a fax. In an aspect, transmitting the signal to facilitate execution of the first process on the first computing device can comprise sending a user an e-mail message. In an aspect, transmitting the signal to facilitate execution of the first process on the first computing device can comprise transmitting a first response signal to the network address translation router. The first response signal can cause the network address translation router to transmit a subsequent response signal to the first computing device.

In an aspect, upon execution of the first process, the first process can be configured to compare information located in a local storage of the first computing device with a predetermined list of domains. In an aspect, the first process can be configured to detect that the first computing device is compromised based on a match between the information located in the local storage and an item in the predetermined list of domains. In an aspect, the first process can take action in response to said detection that the first computing device is compromised. For example, the action taken can comprise requesting computer-readable code for performing a second process.

In an aspect, once the signal to facilitate execution of the first process on the computing device located downstream from the network device 116, such as computing device 102a or computing device 102b is transmitted, the computing device located downstream from the network device 116 can cause a set of computer-executable instructions for performing the first process to be transmitted from the storage 124 of a remote computing device 104b. The computing device located downstream from the network device 116 can cause the set of computer-executable instructions for performing the first process to be transmitted by sending a transmission request to the remote computing device 104b. In an aspect, the first process can be the DNS scan software 122. In an aspect, the DNS scan software 122 can be a plurality of processes from which an appropriate process can be selected based on one or more factors, such as suspicious activity detected, computing device used, operating system running on the computing device, subscription associated with the computing device, and the like. In an aspect, the one or more computing devices 102a, 102b can run the downloaded DNS scan software 122. In an aspect, the DNS scan software 122, when run, can scan a local DNS cache of the one or more computing devices 102a, 102b to determine if the one or more computing devices 102a, 102b have been exposed to a potential source of malware (e.g., determine if the computing device is infected). In an aspect, if one of the one or more computing devices 102a, 102b is determined to be infected with malware, then further corrective action can be taken.

Figure 4:
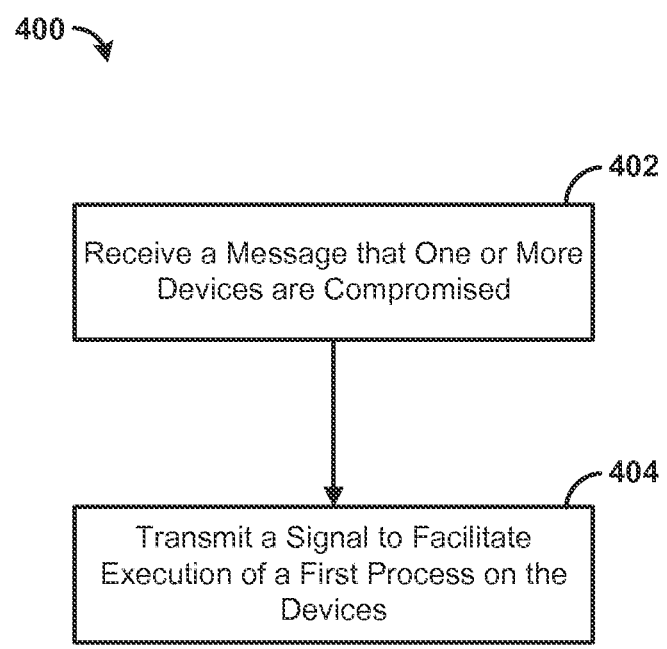
FIG. 4 illustrates a flow diagram of an exemplary process performed at a network device.

FIG. 4 illustrates a process 400 in accordance with the systems and methods disclosed herein. In step 402, a network device 116 can receive a message indicating that one or more of a plurality of devices 102a, 102b is compromised. In an aspect, a network device can be a gateway or router that hides the address of attached devices, such as a Network Address Translation (NAT) router. The message can comprise any messaging protocol, including Internet Protocol (IP). The message can be sent in response to a determination that one of a plurality of devices attached to the network device sent a suspicious request. A suspicious request can comprise a request for a website, a request for an application, a request to send an e-mail, and the like. In an aspect, a suspicious request can comprise a request to access a known malware server, one of several requests for a particular website sent from the same computing device in a short period of time, a request for a website or application that is known to be malicious, a suspicious e-mail message, or the like. In an aspect, a suspicious e-mail message can comprise a suspicious "to" address, "from" address, subject, attachment, body, and/or link within a body. For example, the suspicious message can be an e-mail message where the "from" address does not match the origin of the message. In another example, an e-mail message can comprise a hyperlink that is known to be malicious. In yet another example, an e-mail message can comprise several instances of one or more keywords known to be prevalent in unsolicited e-mail offers.

In an aspect, the determination that one of a plurality of devices attached to the network device created a suspicious request can comprise comparing the suspicious request with a predetermined list of domains. In an aspect, the predetermined list of domains can be a list of domains considered to be suspicious. In a further aspect, if the request comprises a request for a domain that is also on the list of domains considered to be suspicious, then the device from which the message originated can be considered compromised. In an aspect, the predetermined list of domains can be a list of domains considered to be legitimate. In a further aspect, if the request does not comprise a request for a domain that is also on the list of domains considered to be legitimate, then the device can be considered compromised. In another further aspect, if the request does not comprise a request for a domain that is also on the list of domains considered to be legitimate, then the request can be flagged for further inspection. In an aspect, further inspection can comprise extracting a domain requested from the request and monitoring for more requests from the same originator. In a further aspect, monitoring for more requests from the same originator can flag a request for the same domain in a threshold window of time as suspicious. In another aspect, the determination that the request originated from a compromised device can comprise determining that the request claims to be from one source, but is actually from a second source. For example, a request to send an e-mail message can purport to be from one e-mail address in the "from" address, but actually be from a second e-mail address.

In an aspect, the determination that one of a plurality of devices attached to the network device created a suspicious request can comprise recognizing the suspicious request as part of a suspicious pattern. A suspicious pattern can comprise accessing an electronic file a threshold number of times or more during a threshold window of time. A suspicious pattern can comprise accessing a domain a threshold number of times or more during a threshold window of time. A suspicious pattern can comprise accessing an electronic file at the same time on two or more days. A suspicious pattern can comprise accessing a domain at the same time on two or more days.

The determination that one of a plurality of devices attached to the network device created a suspicious request can comprise comparing the sender of the suspicious request with a predetermined list of domains. The determination that the suspicious request originated from a compromised device can comprise comparing the claimed sender of the suspicious request with a predetermined list of domains. The determination that one of a plurality of devices attached to the network device created a suspicious request can comprise comparing one or more of the addressees of the suspicious request, including those addressees carbon copied (cc'd) and blind carbon copied (bcc'd), with a predetermined list of domains. The determination that the message originated from a compromised device can comprise comparing the subject of the message with a predetermined list of domains. The determination that one of a plurality of devices attached to the network device created a suspicious request can comprise comparing the body of the request, including one or more links or hyperlinks, with a predetermined list of domains.

In step 404, a network device 116 can transmit a signal to facilitate execution of a first process on the one or more of the plurality of devices 102a, 102b. In an aspect, transmitting the signal to facilitate execution of the first process on the one or more of the plurality of devices can comprise calling a user. In an aspect, transmitting the signal to facilitate execution of the first process on the one or more of the plurality of devices can comprise causing a physical message to be sent to a user, for example a letter or a facsimile. In an aspect, transmitting the signal to facilitate execution of the first process on the one or more of the plurality of devices can comprise causing a first computing device to communicate with a second computing device automatically. In an aspect, transmitting the signal to facilitate execution of the first process on the one or more of the plurality of devices can comprise causing a browser to be directed to an address comprising a message. In an aspect, transmitting the signal to facilitate execution of the first process on the one or more of the plurality of devices can comprise causing a message to be displayed in a browser. In an aspect, transmitting the signal to facilitate execution of the first process on the one or more of the plurality of devices can comprise using a network-enabled application. In an aspect, transmitting the signal to facilitate execution of the first process on the one or more of the plurality of devices can comprise sending a user a Short Message Service (SMS) message. In an aspect, transmitting the signal to facilitate execution of the first process on the one or more of the plurality of devices can comprise sending a user a fax. In an aspect, transmitting the signal to facilitate execution of the first process on the one or more of the plurality of devices can comprise sending a user an e-mail message. In an aspect, transmitting the signal to facilitate execution of the first process on the one or more of the plurality of devices can comprise transmitting the signal to facilitate execution of the first process on all of the plurality of devices.

In an aspect, upon execution of the first process on the one or more of the plurality of devices, the first process can be configured to compare information located in a local storage of the one or more of the plurality of devices with a predetermined list of domains. In an aspect, the first process can be configured to initiate action upon determining that the one or more of the plurality of devices is compromised. For example, the action initiated can be configured to request computer-readable code for performing a second process.

In an aspect, once the signal to facilitate execution of the first process on the computing device located downstream from the network device 116, such as computing device 102a (or computing device 102b) is transmitted, the computing device located downstream from the network device 116 can cause a set of computer-executable instructions for performing the first process to be transmitted from the storage 124 of a remote computing device 104b. The computing device located downstream from the network device 116 can cause the set of computer-executable instructions for performing the first process to be transmitted by sending a transmission request to the remote computing device 104b. In an aspect, the first process can be the DNS scan software 122. In an aspect, the DNS scan software 122 can be a plurality of processes from which an appropriate process can be chosen based on one or more factors, such as suspicious activity detected, computing device used, operating system running on the computing device, subscription associated with the computing device, and the like. In an aspect, the one or more computing devices 102a, 102b can run the downloaded DNS scan software 122. In an aspect, the DNS scan software 122, when run, can scan the local DNS cache of the one or more computing devices 102a, 102b to determine if the one or more computing devices 102a, 102b have been exposed to a potential source of malware (e.g., determine if the computing device is infected). In an aspect, if one of the one or more computing devices 102a, 102b is determined to be infected with malware, then further corrective action can be taken.

Figure 5:
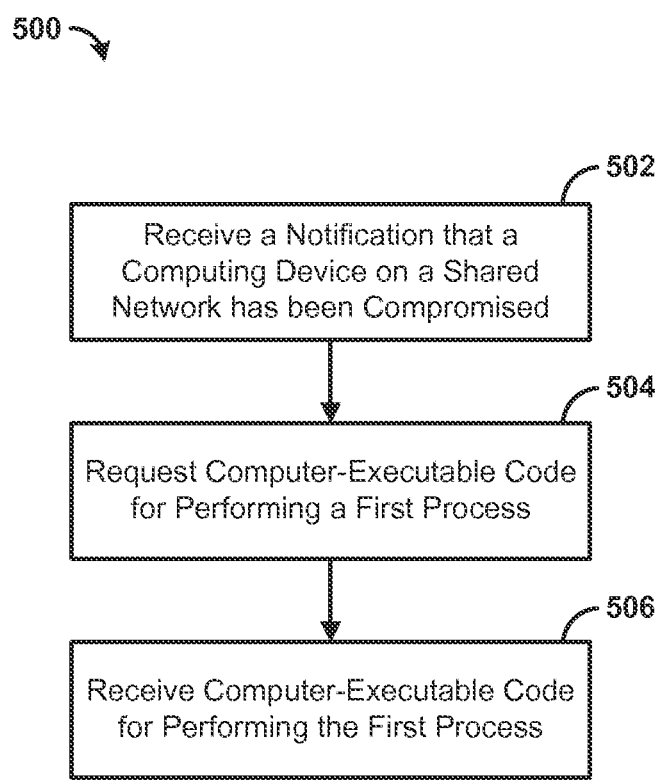
FIG. 5 illustrates a flow diagram of an exemplary process performed at a computing device.

FIG. 5 illustrates a process 500 in accordance with the systems and methods disclosed herein. In step 502, a computing device 102a, 102b can receive a notification that a computing device on a shared network (for example, the computing devices 102a, 102b connected to a network device 116) has been compromised. The notification that the computing device on the shared network has been compromised can comprise any messaging protocol, including Internet protocol (IP). In an aspect, the notification that the computing device on the shared network has been compromised can comprise calling a user. In an aspect, the notification that the computing device on the shared network has been compromised can comprise causing a physical message to be sent to a user. In an aspect, the notification that the computing device on the shared network has been compromised can comprise causing a first computing device to communicate with a second computing device automatically. In an aspect, the notification that the computing device on the shared network has been compromised can comprise causing a browser to be directed to an address comprising a message. In an aspect, the notification that the computing device on the shared network has been compromised can comprise causing a message to be displayed in a browser. In an aspect, the notification that the computing device on the shared network has been compromised can comprise using a network-enabled application. In an aspect, the notification that the computing device on the shared network has been compromised can comprise sending a user a Short Message Service (SMS) message. In an aspect, the notification that the computing device on the shared network has been compromised can comprise sending a user a fax. In an aspect, the notification that the computing device on the shared network has been compromised can comprise sending a user an e-mail message. In an aspect, the notification that the computing device on the shared network has been compromised can be based on an e-mail message created by the computing device. In an aspect, receiving the notification that the computing device on the shared network has been compromised can be based at least on recognizing a pattern. In an aspect, the pattern can comprise accessing an electronic file a plurality of times during a threshold window of time.

In an aspect, the notification can be sent in response to a determination that one of a plurality of computing devices attached to a network device created a suspicious request. A suspicious request can comprise a request for a website, a request for an application, a request to send an e-mail, and the like. In an aspect, a suspicious request can comprise a request to access a known malware server, one of several requests for a particular website sent from the same computing device in a short period of time, a request for a website or application that is known to be malicious, a suspicious e-mail message, or the like. In an aspect, a suspicious e-mail message can comprise a suspicious "to" address, "from" address, subject, attachment, body, and/or link within a body. For example, the suspicious message can be an e-mail message where the "from" address does not match the origin of the message. In another example, an e-mail message can comprise a hyperlink that is known to be malicious. In yet another example, an e-mail message can comprise several instances of one or more keywords known to be prevalent in unsolicited e-mail offers.

In an aspect, the determination that one of a plurality of devices attached to the network device created a suspicious request can comprise comparing the suspicious request with a predetermined list of domains. In an aspect, the predetermined list of domains can be a list of domains considered to be suspicious. In a further aspect, if the request comprises a request for a domain, which is also on the list of domains considered to be suspicious, then the device from which the message originated can be considered compromised. In an aspect, the predetermined list of domains can be a list of domains considered to be legitimate. In a further aspect, if the request does not comprise a request for a domain which is also on the list of domains considered to be legitimate, then the device can be considered compromised. In another further aspect, if the request does not comprise a request for a domain which is also on the list of domains considered to be legitimate, then the request can be flagged for further inspection. In an aspect, further inspection can comprise extracting a domain requested from the request and monitoring for more requests from the same originator. In a further aspect, monitoring for more requests from the same originator can flag a request for the same domain in a threshold window of time as suspicious. In another aspect, the determination that the request originated from a compromised device can comprise determining that the request claims to be from one source, but is actually from a second source. For example, a request to send an e-mail message can purport to be from one e-mail address in the "from" address, but actually be from a second e-mail address.

In an aspect, the determination that one of a plurality of devices attached to the network device created a suspicious request can comprise recognizing the suspicious request as part of a suspicious pattern. A suspicious pattern can comprise accessing an electronic file a threshold number of times or more during a threshold window of time. A suspicious pattern can comprise accessing a domain a threshold number of times or more during a threshold window of time. A suspicious pattern can comprise accessing an electronic file at the same time on two or more days. A suspicious pattern can comprise accessing a domain at the same time on two or more days.

The determination that one of a plurality of devices attached to the network device created a suspicious request can comprise comparing the sender of the suspicious request with a predetermined list of domains. The determination that the suspicious request originated from a compromised device can comprise comparing the claimed sender of the suspicious request with a predetermined list of domains. The determination that one of a plurality of devices attached to the network device created a suspicious request can comprise comparing one or more of the addressees of the suspicious request, including those addressees carbon copied (cc'd) and blind carbon copied (bcc'd), with a predetermined list of domains. The determination that the message originated from a compromised device can comprise comparing the subject of the message with a predetermined list of domains. The determination that one of a plurality of devices attached to the network device created a suspicious request can comprise comparing the body of the request, including one or more links or hyperlinks, with a predetermined list of domains.

In step 504, the computing device 102*a*, 102*b* can request computer-executable code for performing a first process. In an aspect, the request can be transmitted in response to receiving the notification. In an aspect, the request can be to access a set of computer-executable instructions for executing the first process from the storage 124 of a remote computing device 104*b*. In an aspect, the first process can be the DNS scan software 122. In an aspect, the DNS scan software 12 can be a plurality of processes from which an appropriate process can be chosen based on factors, such as suspicious activity detected, computing device used, operating system running on the computing device, subscription associated with the computing device, and the like.

In step 506, the computing device 102*a*, 102*b* can receive computer-executable code for performing the first process. For example, the one or more computing devices 102*a*, 102*b* can run the downloaded DNS scan software 122. In an aspect, upon execution, the first process can be configured to compare information located in a local storage with a predetermined list of domains. For example, the DNS scan software 122, when run, can scan the local DNS cache of the one or more computing devices 102a, 102b to determine if the one or more computing devices 102a, 102b are infected. In an aspect, if one of the one or more computing devices 102a, 102b is determined to be infected with malware, then further corrective action can be taken. In an aspect, the first process can be configured to detect an issue if the information in the local storage matches an item in the predetermined list of domains. In an aspect, the first process can be configured to initiate action in response to the first process detecting an issue. In an aspect, the initiated action can be configured to request computer-executable code for performing a second process.

Figure 6:
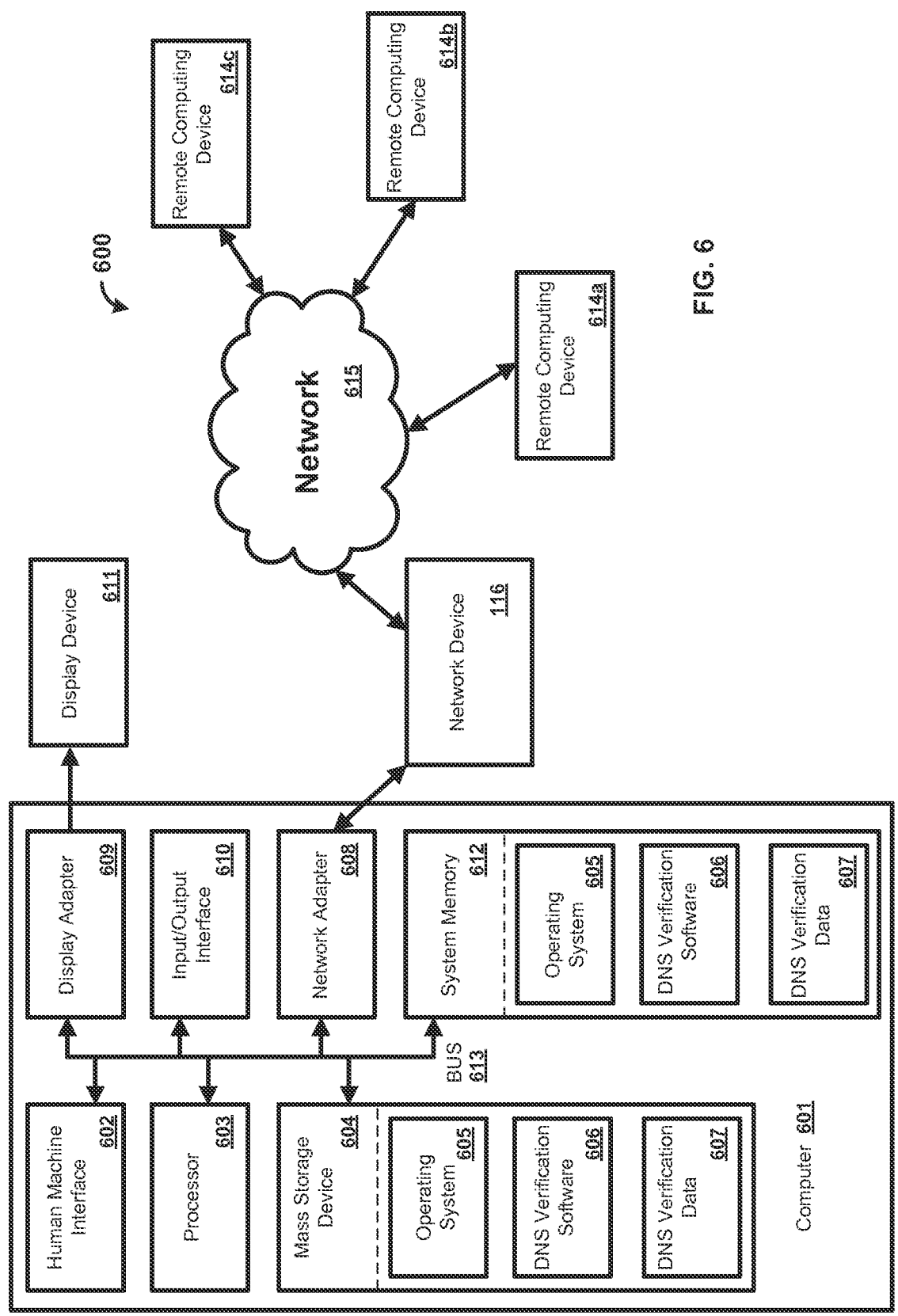
FIG. 6 illustrates an exemplary system.

In an exemplary aspect, the methods and systems can be implemented on a computer 601 as illustrated in FIG. 6 and described below. By way of example, computing device 102a, 102b and/or computing device 104a, 104b of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, DNS verification software 606, DNS verification data 607, a network adapter 608, system memory 612, an Input/Output Interface 610, a display adapter 609, a display device 611, and a human machine interface 602, can be contained within one or more remote computing devices 614a, b, c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as DNS verification data 607 and/or program modules such as operating system 605 and DNS verification software 606 that are immediately accessible to and/or are presently operated on by the processing unit 603.

In another aspect, the computer 601 can also comprise other removable/non-removable, volatile/non-volatile computer storage media. By way of example, FIG. 6 illustrates a mass storage device 604, which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and DNS verification software 606. Each of the operating system 605 and DNS verification software 606 (or some combination thereof) can comprise elements of the programming and the DNS verification software 606. DNS verification data 607 can also be stored on the mass storage device 604. DNS verification data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g. a "mouse"), a microphone, a joystick, a scanner, tactile input devices such as gloves, and other body coverings, and the like. These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614*a, b, c*. By way of example, a remote computing device can be a personal computer, portable computer, smart phone, a server, a router, a network computer, a peer device or other common network node, and so on. Logical connections between the computer 601 and a remote computing device 614*a, b, c* can be made via a network 615, such as a local area network (LAN) and/or a general wide area network (WAN). Such network connections can be through a network adapter 608. A network adapter 608 can be in communication with a network device 116. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of DNS verification software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by a domain name server, a message comprising a device identifier associated with a network address translation device;
   determining, based on the device identifier, that the message originates from at least one client device of a plurality of client devices associated with the network address translation device;
   determining, based on the message, that the at least one client device of the plurality of client devices is compromised; and
   based on the at least one client device of the plurality of client devices being compromised, causing the at least one compromised client device and at least one non-compromised client device of the plurality of client devices to compare information stored in a local storage of each client device of the plurality of client devices with a stored list of domains.

2. The method of claim 1, further comprising sending, to the network address translation device, a signal, wherein the signal causes one or more of a notification to be sent to a first client device of the plurality of client devices.

3. The method of claim 1, further comprising:
  determining, based on a match between the information stored in the local storage and an of domains, that the at least one client device is item in the stored list of domains, that compromised; and
  causing, based on determining that the at least one client device is compromised, an action.

4. The method of claim 1, wherein determining that the at least one client device is compromised comprises determining that the at least one client device is infected with one or more of malware, spyware, a virus, or a Trojan.

5. The method of claim 1, wherein the message comprises an e-mail message.

6. The method of claim 1, wherein determining that the at least one client device of the plurality of client devices is compromised comprises determining a pattern.

7. The method of claim 6, wherein the pattern comprises a quantity of requests, by the at least one client device, for an electronic file within a time window.

8. The method of claim 1, further comprising: sending a first response signal to the network address translation device, wherein the first response signal causes the network address translation device to send a subsequent response signal to each client device of the plurality of client devices.

9. A domain name server apparatus comprising:
  one or more processors; and
  memory storing processor executable instructions that, when executed by the one or more processors, cause the domain name server apparatus to:
    receive a message comprising a device identifier associated with a network address translation device;
    determine, based on the device identifier, that the message originates from one or more client devices of a plurality of client devices associated with the network address translation device, wherein the message indicates that the one or more client devices of the plurality of client devices is compromised; and
    based on the one or more client devices of the plurality of client devices being compromised, cause the one or more compromised client devices and one or more non-compromised client devices of the plurality of client devices to compare information stored in a local storage of each client device of the plurality of client devices with a stored list of domains.

10. The domain name server apparatus of claim 9, wherein the processor executable instructions, when executed by the one or more processors further cause, based on determining that the one or more client devices of the plurality of client devices is compromised, the one or client devices to execute an action.

11. The domain name server apparatus of claim 9, wherein the message indicating that the one or more client devices of the plurality of client devices is compromised indicates that the one or more client devices of the plurality of client devices is infected with one or more of malware, spyware, a virus, or a Trojan.

12. The domain name server apparatus of claim 10, wherein the action comprises causing a browser to be directed to an address comprising another message.

13. A method comprising:
  sending, by a network address translation device, to a domain name server, a message comprising a device identifier of the network address translation device, wherein the message originates from at least one client device of a plurality of client devices associated with a shared network;
  receiving, based on the device identifier and the message, a notification that the at least one client device of the plurality of client devices is compromised; and
  receiving, based on a request and based on the notification that the at least one client device of the plurality of client devices is compromised, computer-executable code configured to cause the at least one compromised client device and at least one non-compromised client device of the plurality of client devices to compare information stored in a local storage associated with each client device of the plurality of client devices with a stored list of domains.

14. The method of claim 13, further comprising determining, based on the information stored in the local storage matching an item in the stored list of domains, the at least one compromised client device.

15. The method of claim 14, further comprising causing the at least one compromised client device to execute an anti-malware action.

16. The method of claim 13, wherein the notification indicates that the at least one client device of the plurality of client devices is infected with one or more of malware, spyware, a virus, or a Trojan.

17. The method of claim 13, wherein the notification is based on an e-mail message generated by the at least one client device.

18. The method of claim 13, wherein the notification is based on determining a pattern of requests associated with the at least one client device.

19. The method of claim 18, wherein the pattern of requests comprises a quantity of requests for an electronic file by the at least one client device within a time window.

20. The domain name server apparatus of claim 9, wherein the message indicating that the one or more client devices of the plurality of client devices is compromised is associated with a pattern of requests.

21. The method of claim 1, wherein the network address translation device is associated with a local area network and wherein the network address translation device comprises at least one of: a router, a modem, or a gateway.

* * * * *